(12) United States Patent
Lebourg et al.

(10) Patent No.: US 10,768,274 B2
(45) Date of Patent: Sep. 8, 2020

(54) BUILT-IN SENSOR FOR INTERCEPTING RADIOELECTRIC COM/RAD EMISSIONS

(71) Applicant: THALES, Courbevoie (FR)

(72) Inventors: Thierry Lebourg, Gennevilliers (FR); Renaud Saada, Elancourt (FR); Nicolas Sentenac, Elancourt (FR)

(73) Assignee: THALES, Courbevoie (FR)

( * ) Notice: Subject to any disclaimer, the term of this patent is extended or adjusted under 35 U.S.C. 154(b) by 183 days.

(21) Appl. No.: 16/076,406

(22) PCT Filed: Feb. 24, 2017

(86) PCT No.: PCT/EP2017/054365
§ 371 (c)(1),
(2) Date: Aug. 8, 2018

(87) PCT Pub. No.: WO2017/144679
PCT Pub. Date: Aug. 31, 2017

(65) Prior Publication Data
US 2019/0339357 A1 Nov. 7, 2019

(30) Foreign Application Priority Data

Feb. 26, 2016 (FR) ..................... 16 00326

(51) Int. Cl.
*G01S 7/02* (2006.01)
*H01Q 3/24* (2006.01)
(Continued)

(52) U.S. Cl.
CPC ............... *G01S 7/021* (2013.01); *H01Q 3/24* (2013.01); *H04B 7/10* (2013.01)

(58) Field of Classification Search
CPC combination set(s) only.
See application file for complete search history.

(56) References Cited

U.S. PATENT DOCUMENTS 5,977,902 A * 11/1999 Magne ............... F42C 13/02
102/427
2006/0058035 A1 3/2006 Tsuruno
(Continued)

OTHER PUBLICATIONS

French Search Report issued in connection with French Application No. FR 1600326, dated Oct. 27, 2016, 3 pages.
(Continued)

*Primary Examiner* — Mamadou L Diallo
(74) *Attorney, Agent, or Firm* — Duane Morris LLP

(57) ABSTRACT

This sensor (10), capable of analyzing radar emissions RAD and communication emissions COM, includes: a reception stage (100), shared and capable of digitizing an incident signal; a primary analysis processing stage (200), shared and capable of preprocessing the digitized signal to determine a plurality of primary characteristics of the incident signal; and a secondary analysis processing stage (300), including a chain (400) for processing the preprocessed digitized signal dedicated to COM emissions and a chain (500) for processing the preprocessed digitized signal dedicated to RAD emissions, the primary analysis processing stage (200) including a discrimination module capable of applying the preprocessed digitized signal at the input of the chain (400) dedicated to COM emissions and/or of the chain (500) dedicated to RAD emissions, from primary characteristics determined for the incident signal.

15 Claims, 5 Drawing Sheets

(51) Int. Cl.
*H01B 7/10* (2006.01)
*H04B 7/10* (2017.01)

(56) References Cited

U.S. PATENT DOCUMENTS

2007/0063912 A1* 3/2007 Cortambert .............. H01Q 1/32
 343/824
2013/0103233 A1* 4/2013 Bourret .................. B64D 45/04
 701/18
2013/0218499 A1* 8/2013 Lemer .................... G01D 18/00
 702/85

OTHER PUBLICATIONS

International Search Report issued in connection with International Patent Application No. PCT/EP2017/054365, dated May 9, 2017, 5 pages.

* cited by examiner

BUILT-IN SENSOR FOR INTERCEPTING RADIOELECTRIC COM/RAD EMISSIONS

CROSS-REFERENCE TO RELATED APPLICATIONS

This application is a U.S. national stage application under 35 U.S.C. § 371 of International Application No. PCT/EP2017/054365, filed Feb. 24, 2017, which claims priority to French patent application No. 1600326, filed Feb. 26, 2016, the entireties of which are incorporated herein by reference.

The present invention relates to the field of sensors for intercepting radioelectric COM/RAD emissions, whether for civilian or military applications.

Document US 2006/058035 A1 describes a receiver for communication signals, which can detect the presence of a radar signal in a received signal.

In the civilian world, this field of sensors for intercepting radioelectric emissions corresponds to monitoring the radiofrequency spectrum, which can be done by frequency regulating bodies, to monitor frequency allocations as well as to detect, locate and identify unauthorized or disruptive radioelectric emissions.

In the military world, this field corresponds to functions for monitoring and listening to radar and/or radiocommunication emissions for electronic war purposes (intelligence function, situational awareness function, alert function with respect to threatening emissions).

Radioelectric emissions are classified in two types: communication emissions, or COM hereinafter (radiobroadcasting, television broadcasting, mobile telephones, microwave radio systems, satellite communications, tactical military radio, etc.) and radar emissions, or RAD hereinafter (surveillance, navigation, guidance, firing, etc.).

Due on the one hand to their separate spectral domains, and on the other hand to their different temporal modulations, the techniques implemented to intercept and analyze RAD and COM radioelectric signals are adapted to the nature of the RAD and COM waveforms and have led to the production of sensors dedicated to RAD interception and sensors dedicated to COM interception.

Furthermore, this interception requires the implementation of several RAD sensors or several COM sensors making it possible to cover all or part of the spectral domain including the HF, VHF, UHF and SHF bands.

However, the spectral and temporal separation of these two types of signals has dwindled over time: indeed, the increase in processing capabilities, in particular those of computers, has made it possible to use more complex waveforms, even in broadband, which was previously impossible. This has opened up new possibilities for communication emissions (increased bandwidth and therefore throughput) and radar emissions (more complex waveforms, therefore better protected from jamming and making it possible to extract more information from intercepted targets).

As a result, an interception sensor receives a mix of COM signals and RAD signals. If it is an RAD sensor, the COM signals constitute stray signals that must be eliminated to analyze the RAD signals, and reciprocally, if it is a COM sensor, the RAD signals constitute stray signals that must be eliminated to analyze the COM signals. The absence of processing to eliminate stray signals disrupts or degrades the useful signals, and therefore the quality of the analysis thereof.

Furthermore, an effort is often made to characterize the radioelectric emissions irrespective of their origin (COM or RAD), which causes the use of at least two sensors (an RAD sensor and a COM sensor) on a same platform (land vehicle, aircraft, surface building, etc.).

Yet this increases the complexity of the integration on the platform. The hardware resources (antennas, RF receivers and processing units) being separate, this causes an increase in mass, volume and electricity consumption, as well as a problem with integration of the antenna arrays of the RAD sensor and the COM sensor on the same platform.

Furthermore, the vast expanse of the spectral domain to be covered involves using several antenna arrays for each RAD sensor and for each COM sensor used.

In conclusion, the juxtaposition of a COM sensor and an RAD sensor is less and less relevant, both in terms of performance and of integration constraints on the platform.

There is therefore a need for a sensor for intercepting radioelectric emissions making it possible to achieve the desired integration.

To that end, the invention relates to a sensor for intercepting radioelectric signals according to the claims.

The invention consists of a built-in RAD/COM sensor simultaneously processing communication emissions and radar emissions, the architecture of which allows maximum resource pooling, from the reception antennas to the primary processing means, only the secondary processing means being dedicated either to processing COM signals or to processing RAD signals.

The built-in RAD/COM sensor according to the invention offers the possibility of monitoring the radiofrequency spectrum and/or intercepting both radar or communication transmitters and multifunctional weapons systems in increasingly dense electromagnetic environments with entanglement of the radar and communication bands.

The built-in RAD/COM sensor according to the invention further has the advantage of being modular and having a smaller bulk than a solution juxtaposing an RAD reception sensor and a COM reception sensor.

The invention and its advantages will be better understood upon reading the following detailed description of one particular embodiment, provided solely as a non-limiting example, this description being done in reference to the appended drawings, in which.

Figure 1:
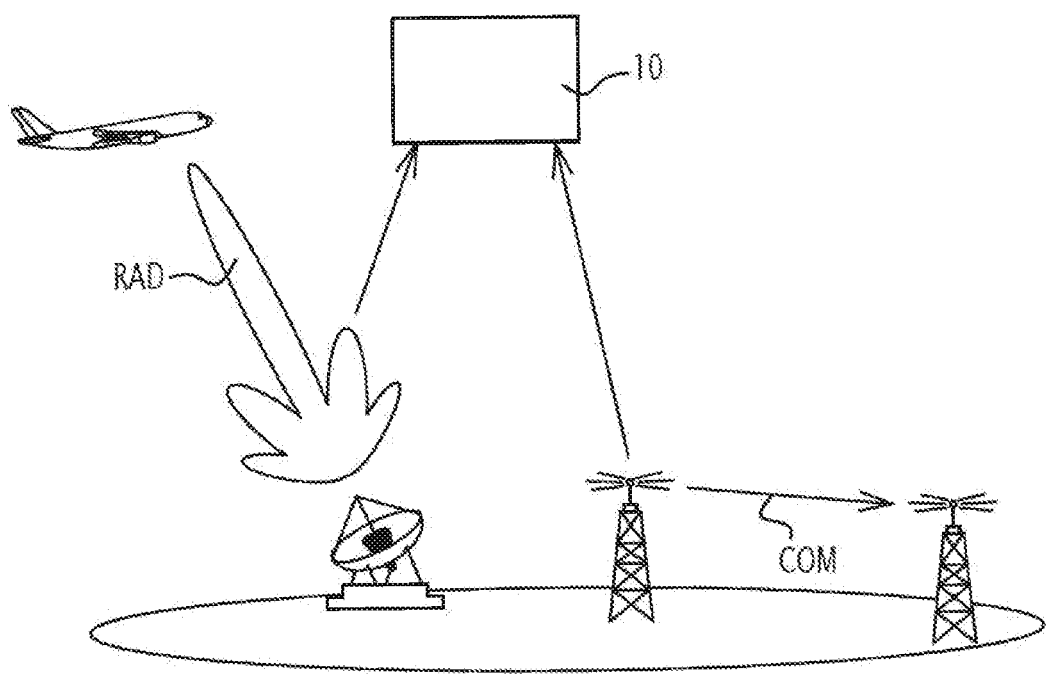
FIG. 1 is a schematic illustration of the usage context of the built-in RAD/COM sensor according to the invention.

As shown in FIG. 1, the sensor 10 for intercepting radioelectric emissions according to the invention, also called built-in RAD/COM sensor hereinafter, receives and analyzes radioelectric signals emitted by different transmitters, whether they correspond to radar emissions (RAD emissions) or communication emissions (COM emissions).

The built-in RAD/COM sensor 10 has an architecture making it possible to conduct a primary analysis of the received radiofrequency signals independently of the nature of the signals (RAD or COM emissions), then to continue this analysis (secondary analysis) by two types of processing, one dedicated to RAD emissions and the other dedicated to COM emissions. In this way, the number of shared components between the RAD and COM processing chains is maximized, in particular the hardware acquisition components and the computing resources allowing the primary analysis. This hardware streamlining has the advantage of reducing the bulk of the built-in sensor and making it easier to install on a carrier.

Figure 2:
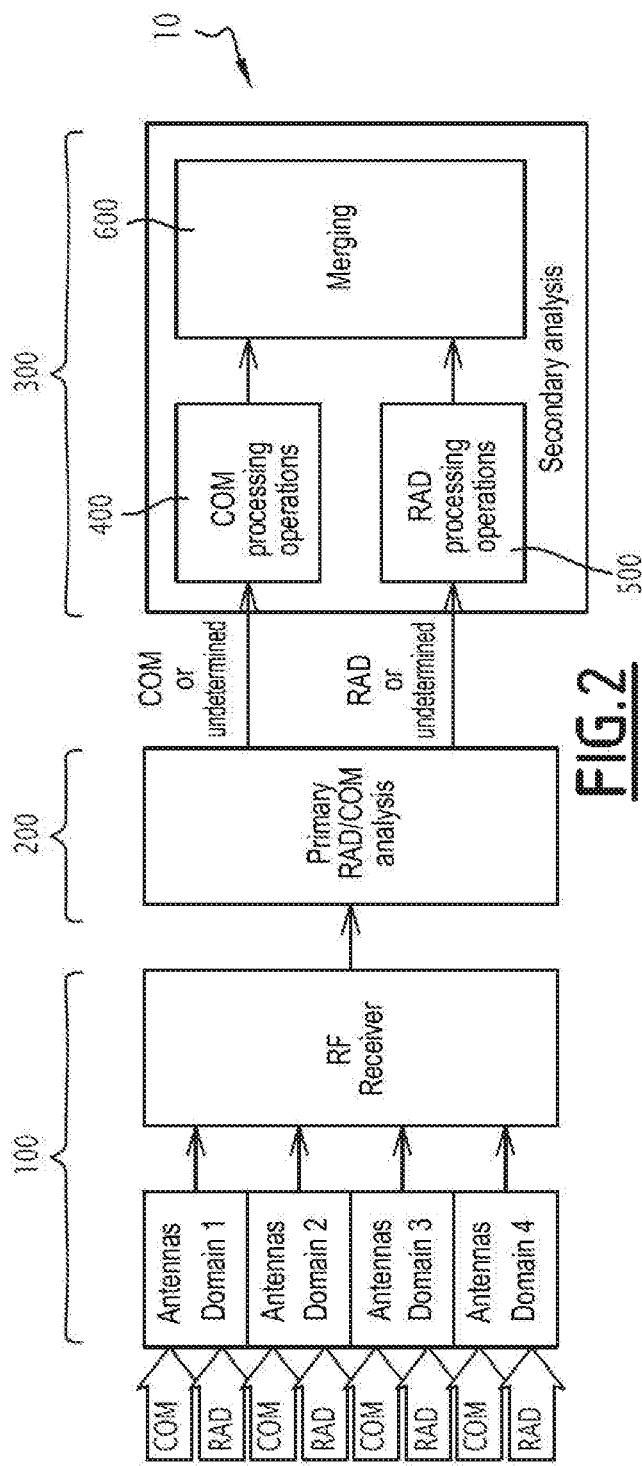
FIG. 2 is a high-level schematic illustration in block form of the architecture of the built-in RAD/COM sensor according to the invention.

As shown in FIG. 2, the sensor 10 includes a reception stage 100. This is a stage for pooling reception hardware resources (antennas, radiofrequency receivers, analog-digital conversions and digital processing).

The sensor 10 includes a primary analysis processing stage 200 for the primary analysis of the digital signals delivered by the reception stage 100. Several processing operations are applied to the signals irrespective of their nature (RAD emission or COM emission) and their waveform (continuous or pulsed, narrowband or wideband). This primary analysis, independent of the nature of the intercepted emission, makes it possible, for each elementary signal, to characterize it, in particular by its duration, its time of arrival (TOA), its instantaneous band, its central frequency, its amplitude, and optionally its direction of arrival (DOA). The last processing operation done in the stage 200 consists, from characteristics of the elementary signal and a priori knowledge, of estimating the type (RAD, COM or undetermined) of the transmitter having created this signal.

The sensor 10 includes, downstream from the stage 200 for pooling a certain number of processing operations, a stage 300 for secondary analysis processing. The stage 300 includes one or several processing chains 400 for the signal and/or data dedicated to the COM signals and one or several chains 500 for processing of the signal and/or data dedicated to the RAD signals. The last processing operation potentially done in the stage 300 is a merging processing operation, done by a merging module 600, for the data between the outputs of the different chains, both COM 400 and RAD 500, to deliver, as output, only one consolidated piece of information.

The architecture of the sensor 10 will now be described in more detail, in reference to FIGS. 3 to 5.

Reception Stage 100

Figure 3:
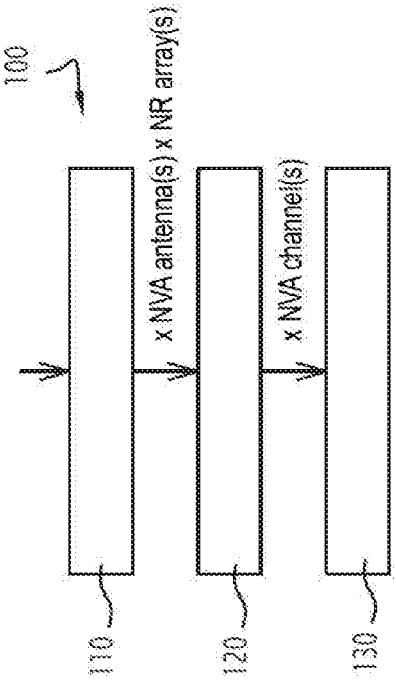
FIG. 3 is a schematic illustration in block form of the reception stage of the built-in RAD/COM sensor of FIG. 2.

As shown schematically in FIG. 3, the stage 100 pools the hardware resources necessary to intercept both RAD emissions and COM emissions.

The stage 100 includes one or several antenna arrays 110. Each array includes at least one antenna.

The stage 100 includes NR antenna arrays 110. Each antenna array is made up of NVA elementary antennas. Each antenna converts the incident electromagnetic signals into electrical signals.

In the preferred embodiment, each array is a frequency sub-range polarization diversity antenna array. The antennas of a same antenna array are thus distributed into two groups: the antennas of a first group are adapted to one polarization and the antennas of a second group are adapted to the polarization orthogonal to that of the first group. For example, if the antennas of the first group are adapted to a horizontal polarization, the antennas of the second group will be adapted to a vertical polarization. Also for example, if the antennas of the first group are adapted to a right circular polarization, the antennas of the second group will be adapted to a left circular polarization. This makes it possible to receive electromagnetic signals irrespective of their polarization.

The number of arrays depends on the desired frequency coverage for the sensor 10. Each antenna array is associated with a particular frequency domain.

The number NR of antenna arrays, the number NVA of antennas per array and the geometry of the antenna arrays are chosen by one skilled in the art based on compromises between the integration constraints of the antenna arrays on the platform, the masks between antennas, the reception sensitivity, the cost, and, when the characterization of the radioelectric signals requires an estimate of the direction of arrival, the precision and protection against ambiguities of the estimate of the direction of arrival.

NR×NVA electric signals are delivered as output of the set of arrays of the sensor.

The stage 100 includes an antenna switch 120, shared by the various antenna arrays 110.

The antenna switch 120 takes, as input, the electric signals from the NVA antennas of each of the NR arrays. The antenna switch 120 selects an antenna array from among the NR antenna arrays and delivers, as output, the NVA electric signals from the antennas of the selected antenna array.

The antenna switch 120 makes it possible to inject taring signals in place of the signals from the different antennas.

The stage 100 lastly includes a radiofrequency receiver 130 with NVA reception channels. The radiofrequency receiver 130 takes, as input, the NVA electric signals at the output of the antenna switch 120, i.e., coming from the NVA antennas of the selected array.

Preferably, this is a synchronous multichannel radiofrequency receiver.

The radiofrequency receiver 130 converts the electric signals within an instantaneous bandwidth IBW located around a reception tuning frequency to which the radiofrequency receiver 130 is dynamically adjusted. The IBW of the receiver 130 as well as the multitone instantaneous dynamic resulting therefrom must be adapted to the environment to be observed.

The signal obtained the output of each reception channel is digitized after amplification and filtering operations and, depending on the reception frequency, one or several frequency transpositions, or not.

The radiofrequency receiver 130 delivers, as output, NVA synchronous digital signals corresponding to the IBW band and the tuning frequency of the receiver.

Primary Analysis Processing Stage 200

The primary analysis processing stage 200 constitutes a digital processing chain of the signal, performing a primary analysis of the elementary signals received in the IBW band irrespective of their type, i.e., without hypothesis on the nature of this signal.

Figure 4:
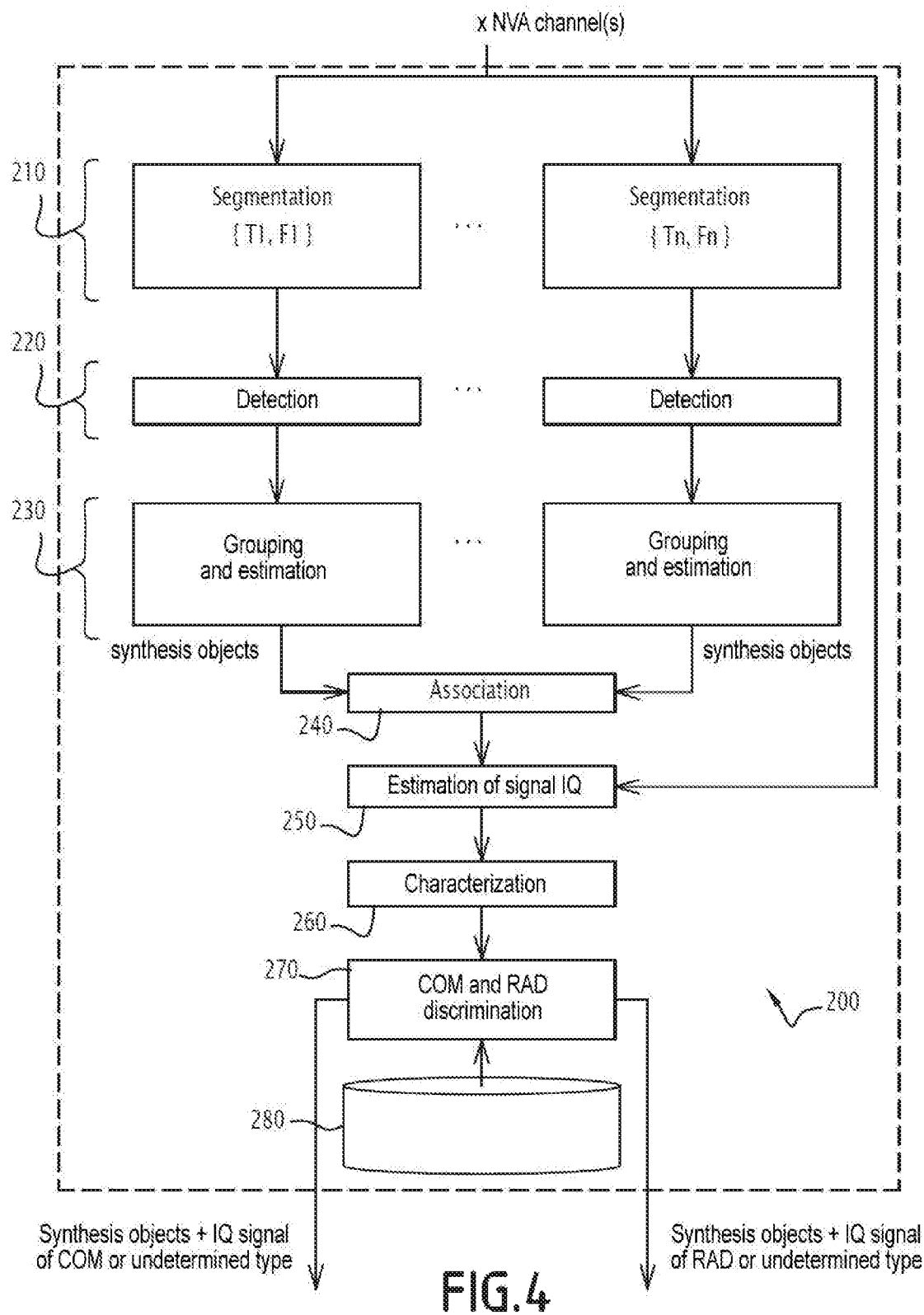
FIG. 4 is a schematic illustration in block form of the primary analysis processing stage of the built-in RAD/COM sensor of FIG. 2.

In the embodiment shown in FIG. 4, the stage 200 includes a module 210 for time-frequency segmentation of the signal for each of the NVA synchronous reception channels of the radiofrequency receiver 130.

When it is executed, the module 210 uses, as input, the digital signal of the considered channel.

The digital signal is cut, synchronously with the other channels, in time and frequency. This cutting is for example done using a filter bank or a Fourier transform.

Figure 6:
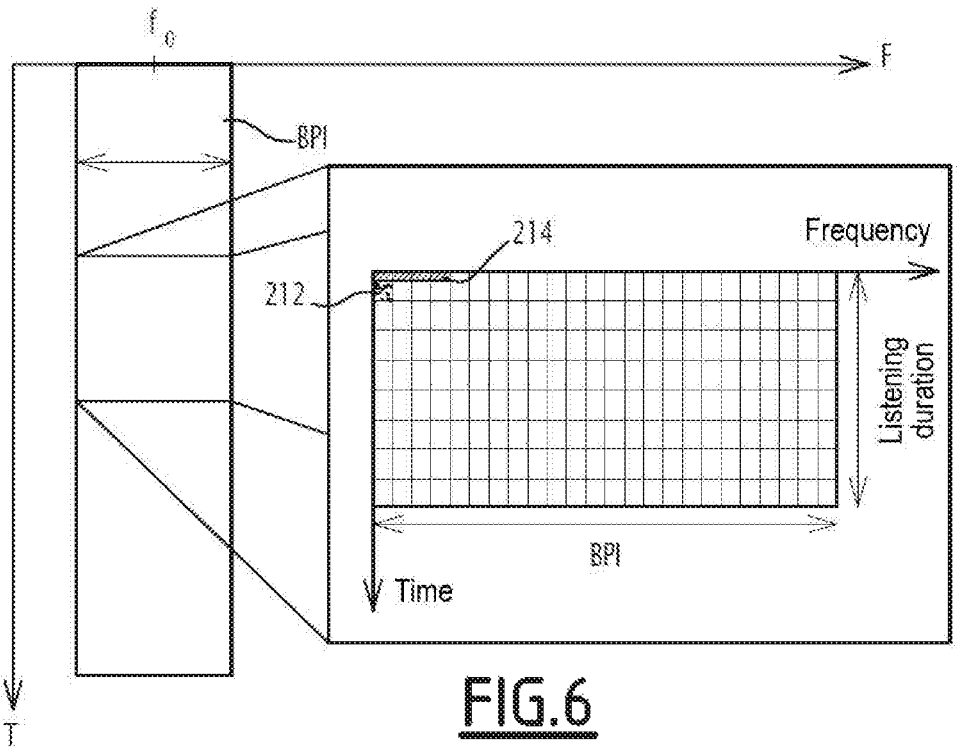
FIG. 6 is a time-frequency graph illustrating the different segmentations done in parallel by the primary processing stage of FIG. 4.

The module 210 segments the signal with at least two time-frequency analysis resolutions, implemented simultaneously. In FIG. 6, which is a time T—frequency F representation, n resolutions {Ti, Fi} are used simultaneously to segment the listening duration—instantaneous bandwidth IBW domain around the frequency f0. This allows the sensor 10 to be adapted to all of the possible waveforms.

The frequency analysis resolutions used can change from one IBW band to the other in order to be as well suited as possible to the waveforms of the communication emissions and the radar emissions that may be intercepted.

For example, one may choose, in the VHF domain, use the time-frequency resolution {800 µs, 12.5 kHz}, box 212 in FIG. 6, jointly with the time-frequency resolution {10 µs, 1 Mhz}, box 214 in FIG. 6.

In order to facilitate the implementation of the association step (carried out by the module 240 presented below), the frequency resolutions must be integer multiples of the smallest frequency resolution and the temporal resolutions must be integer multiples of the smallest temporal resolution.

The stage 200 next includes a detection and counting module 220.

When it is executed, this module performs a detection in each of the time-frequency boxes to determine the presence or absence therein of at least one useful signal more or less embedded in the noise.

The detection can be done conventionally by an estimate of the covariance matrix calculated on the NVA channels and the comparison of the specific values of the obtained covariance matrix with a detection threshold.

The detection threshold traditionally corresponds to a signal-to-noise ratio chosen to obtain a desired detection probability and false alarm probability. To determine this threshold, it is therefore necessary to estimate the noise level.

Relative to the conventional solutions, the estimate of the noise level here is advantageously done by obtaining the average, for all of the boxes distributed in the instantaneous bandwidth IBW of a considered time bracket, of the lowest specific values, adopting the hypothesis that not all of the boxes will be occupied by a useful signal.

This principle makes it possible to have a more precise estimate of the noise level and to increase the counting capacity of the number of co-channel sources (i.e., the number of useful signals present in a same time-frequency box) relative to the methods that seek to differentiate the specific values of the useful signals with respect to the specific values of the noise in a single channel.

Alternatively, another detection method can be carried out by the module 220, consisting of comparing the energy level output by the beam formation of the NVA channels relative to a detection threshold or by comparing the outline of the covariance matrix of each box relative to a detection threshold.

In still another alternative, the detection can be done by thresholding the integration of the energy of adjacent boxes (incoherent integration on a time/frequency domain) when the calculation cost of the covariance matrices is too high to be done systematically.

The stage 200 next includes a module 230 for grouping together detections and characterization of these groupings.

When it is executed, the module 230 estimates primary characteristics of the detections from the covariance matrix. These primary characteristics are for example the date of arrival, the direction of arrival, the polarization, the level, the band, the duration, the frequency, the signal-to-noise ratio, etc., of the detected signal.

In particular, the estimating processing of the direction of arrival of each detection uses the polarization diversity of the antenna arrays to separate the co-channel sources (concomitant emission in the analysis time-frequency box), using traditional algorithms.

Alternatively, the estimating processing of the co-channel source direction of arrival is replaced by estimating processing of the mono-source direction of arrival.

Then, the module 230 groups the detected signals together in a synthesis object. For a COM signal, such an object is known as a plot, but for an RAD signal, such an object is known as a pulse.

The module 230 aggregates all of the detections from the same segmented signal, when they are adjacent in time and/or frequency and they can belong to the same elementary electromagnetic signal. To that end, an estimate of the similarities between adjacent detected signals is done, for example through the calculation of a Mahalanobis distance, on the primary characteristics, in particular the direction of arrival and the polarization.

In one alternative, the estimate of the direction of arrival is eliminated and the grouping of the detected signals is done only on time proximity, frequency, and optionally level criteria.

The synthesis object then summarizes the characteristics of the groupings either via a merging of the characteristics of each of the detected signals, or via a new estimate of the characteristics on the time-frequency zone representing the grouping of the detected signals.

The stage 200 next includes an association module 240 making it possible to choose the best synthesis object, representing a useful signal, from among the n time-frequency analysis resolutions implemented.

When it is executed, the module 240 uses the synthesis objects delivered by the module 230 as input and compares the objects concomitant in time and frequency to retain the m objects offering a synthesis of the incident electromagnetic signal with the best signal-to-noise ratio, i.e., with the time-frequency analysis resolution best adapted to the incident electromagnetic signal. The m selected objects are transmitted to the next signal estimating module.

The stage 200 next includes a module 250 for estimating the signal IQ.

When it is executed, the module 250 uses each of the m synthesis objects representing the m detected useful signals as input, as well as the elementary signals from the channels of the radiofrequency receiver 130.

The module 250 isolates, in the IBW band, the elementary signal corresponding to each of the m objects. The isolation of each elementary signal is done through traditional filtering/frequency decimation operations, optionally completed by spatial filtering processing operations, in particular by channel formation.

This step delivers, as output, for each synthesis object, the synthesis object accompanied by the corresponding baseband signal, called IQ signal.

The stage 200 next includes a module 260 for characterizing the signal.

When it is executed, the module 260 makes it possible, from the signal IQ of each object, to refine the primary characteristics of the elementary signal, developed by the module 230, in particular the estimate of the date of arrival, the duration of the signal and the band of the signal. The estimate of the date of arrival, the duration and the band is done using conventional methods.

The stage 200 next includes a module 270 for discriminating signals.

When it is executed, the module 270 tags, from their primary characteristics, each of the elementary signals associated with the synthesis objects either in COM emission, or in RAD emission, or in undetermined emission when the signal is unknown or when ambiguity exists between COM emission and RAD emission.

As output, the module 270 points toward the appropriate secondary processing operation. Thus, a synthesis object, with its signal IQ, classified as COM emission or undetermined emission, is steered toward the secondary analysis processing chain 400 suitable for communication emissions, while a synthesis object, with its IQ signal, classified as RAD emission or undetermined emission is steered toward the secondary analysis processing chain 500 suitable for radar emissions.

To perform this discrimination between COM signals and RAD signals, the module 270 compares the estimates of duration, frequency and modulation band of the received elementary signals with respect to emission duration/emission frequency/modulation band templates.

Figure 7:
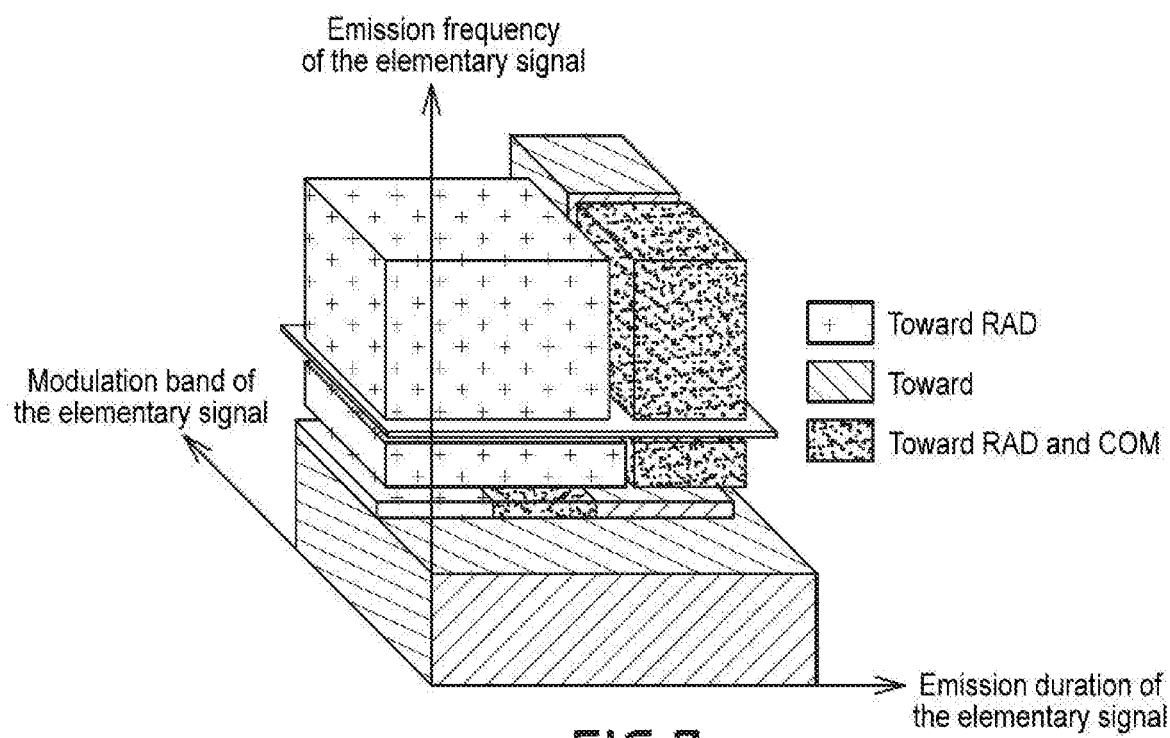
FIG. 7 is a time-frequency-instantaneous band graph illustrating the different templates used by the discriminating means of the primary processing stage of FIG. 4.

As illustrated by FIG. 7, different COM, RAD or COM and RAD templates are predefined and stored in a database 280. These templates synthesize the a priori knowledge of the COM waveforms and RAD waveforms.

The development of the templates is based on a data model that makes it possible to describe, according to known parameters, the elementary signals, for both communication emissions and radar emissions.

Thus, the primary analysis processing operations implemented correspond to detection, radiogoniometry and estimating processing operations of the signal. These processing operations are carried out with several simultaneous time-frequency analysis resolutions, depending on each frequency range, in order to be adapted to all of the COM and RAD waveforms, whether these waveforms are continuous (COM CW, FMCW radar, etc.) or pulsed (EVF plateau, TDMA burst, radar pulse, etc.), narrowband or wideband. The primary analysis processing operations also have a concomitant or co-channel source separation capability to analyze the superimposed emissions. The estimates of the elementary signals done by these primary analysis processing operations (duration, bandwidth, level, direction of arrival, polarization, extraction of the signal itself, etc.) are steered toward the appropriate secondary analysis processing operations based on the primary estimates and the a priori knowledge of the radioelectric emissions.

Secondary Processing Stage 300

Figure 5:
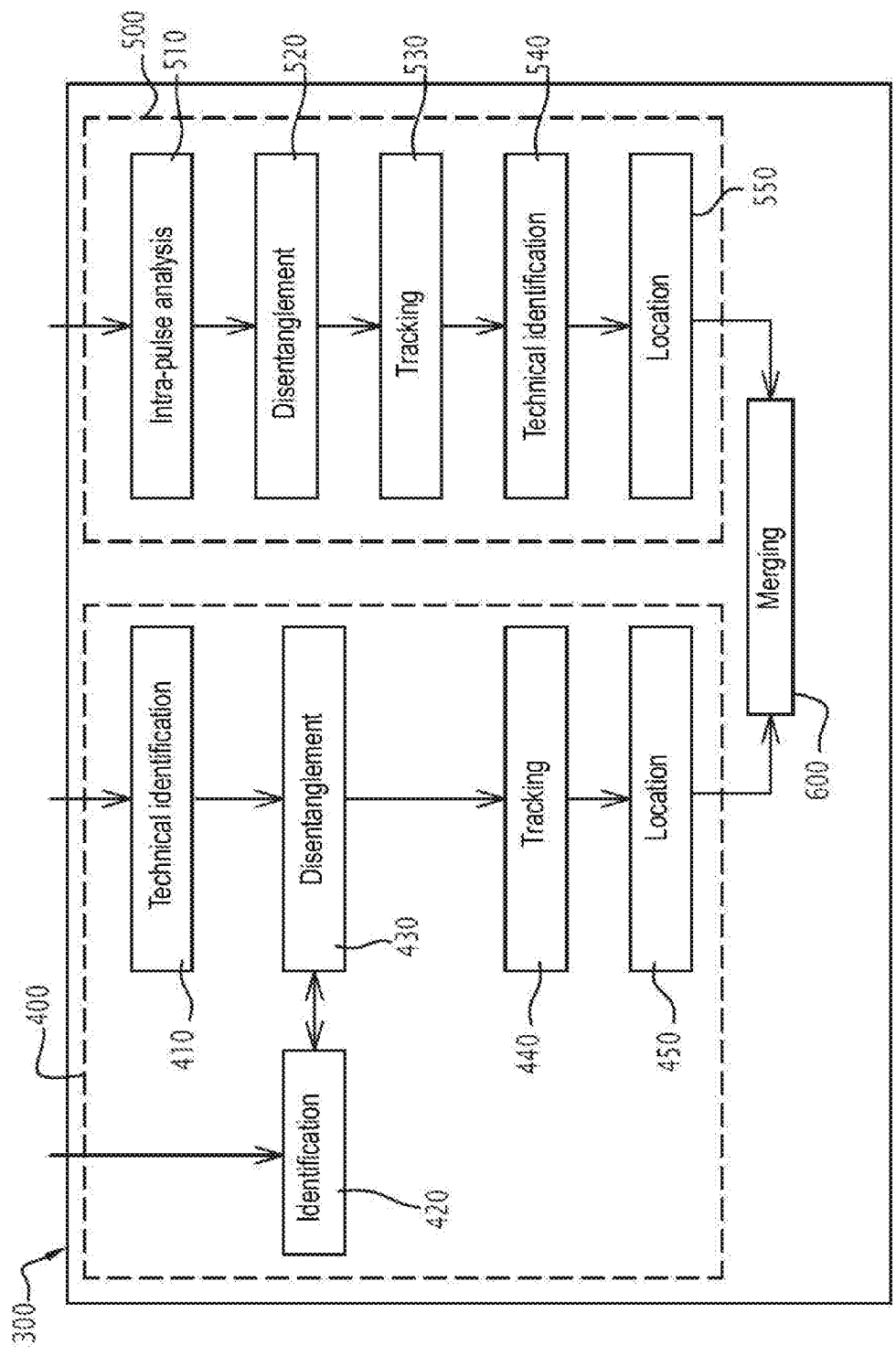
FIG. 5 is a schematic illustration in block form of the secondary processing stage of the built-in RAD/COM sensor of FIG. 2.

At the output of the primary analysis processing stage 200 allowing an integrated analysis of the signals irrespective of type, the secondary analysis processing stage 300 includes, as shown schematically in FIG. 5, a chain 400 dedicated to analyzing COM emissions and a chain 500 dedicated to analyzing RAD emissions.

Each of these chains 400, 500 performs conventional processing operations that are found in the COM sensors and in the RAD reception sensors, respectively.

The chain 400 thus includes:
A systematic COM technical identification module 410;
An on-demand technical identification module 420;
A deinterlacing module 430;
A module 440 for tracking an emission source; and
A module 450 for locating the tracked COM source.

The chain 500 thus includes:
An intra-pulse analysis module 510;
A deinterlacing module 520;
A module 530 for tracking an emission source;
A technical identification module 540 for the tracked RAD source; and
A module 550 for locating the tracked RAD source.

The location module 450 and the location module 550 can advantageously be pooled. This or these location modules make it possible to estimate the position of the COM and RAD transmitters, and conventional location techniques can be used, such as location by scrolling when the platform carrying a sensor 10 is moving relative to stationary signal sources or location by triangulation using several networked sensors 10.

The technical identification of an emission source establishes a list of candidate transmitters by comparison between the analyzed technical characteristics of said emission source and the technical characteristics of the emissions that can be encountered during use, and stored in a database, such a database being based on a model of the communication waveforms and a model of the radar waveforms. Thus, the RAD identification technique leads to a list of RAD emission modes or sub-modes and the COM identification technique leads to a list of COM transmission modes. For military applications, these RAD emission modes and sub-modes and COM transmission modes can be attached to a list of likely emitters, platforms or known weapons systems.

In the built-in RAD/COM sensor 10, the secondary processing operations are suitable for providing the characteristics of tracks, useful for a merging module 600, intended, when it is executed, to produce consolidated information on each intercepted emission, in particular specifying its nature (radar transmitter or radiocommunication transmitter) and its characteristics.

In general, the merging operation makes it possible to synthesize, in a metaobject, data of different natures respectively coming from RAD and COM processing operations. This operation also makes it possible to eliminate any redundancies when elementary signals have been pointed, by the module 270, both toward the secondary analysis processing chain 400 intended for communication emissions and the secondary analysis processing chain 500 intended for radar emissions.

For example, if an elementary signal sent to the secondary analysis processing chains 400 and 500 leads to the technical identification of a COM transmission mode and no technical identification of an RAD mode or sub-mode, then the track coming from the RAD processing chain will be eliminated.

Also for example, if the location of the RAD source and that of the COM source are geographically and/or temporally consistent and if crossing the lists of RAD modes or sub-modes and COM transmission modes makes it possible to identify a shared platform, then the data from each processing chain is grouped together in order to present the operator with only one high-level object having one operational direction for the latter.

It should be noted that with the sensor 10, the interception frequency coverage and the measuring precision of the direction of arrival are identical for the radar emissions and for the communication emissions.

The sensor 10 includes at least one computing unit including, such as a processor, and storage means, such as a random-access and read-only memories, the storage means storing computer program instructions able to be executed by the computing means.

In particular, the modules of the primary or secondary analysis processing stages that have been described above correspond to computer program instructions able to be executed by the computing means. When it is called, a module makes it possible to carry out a corresponding step.

Thus, what has been previously described in terms of devices would also be described in terms of method, in particular primary analysis processing method and secondary analysis processing method. Preferably, these programs are executed in real-time on the signals delivered by the reception stage.

Advantages

The advantages of the sensor described above, relative to the conventional solutions juxtaposing COM sensors and RAD sensors, are numerous.

The sensor 10 allows a decrease in the necessary resources, the latter being streamlined and pooled to perform a reception and a primary characterization of the elementary signals, irrespective of their nature.

The pooling of the resources and processing operations requires accounting for the diversity of the characteristics of the radar emissions and radiocommunication emissions.

Polarization diversity: vertical polarization, horizontal polarization, circular polarization, etc.

Waveform diversity: continuous waveform (FMCW radar, etc.) or pulse diversity (EVF plateau, TDMA burst, radar pulse, etc.).

Waveform band diversity: narrowband or wideband.

Furthermore, the various origins of the signals to be intercepted makes the latter polymorphous, within the meaning of their spectral and temporal coverage. This requires that the primary analysis of the signal be capable of adapting to any signal form.

The decrease in the necessary resources makes it possible to facilitate the integration of the sensor 10 onto a single platform while reducing the mass, volume and electricity consumption.

The sensor 10 allows better accounting for the complexity of the radioelectric environment: the elementary signals extracted from the juxtaposition and entanglement of the communication emissions and radar emissions are separated more effectively.

Furthermore, the built-in RAD/COM primary analysis makes it possible, from primary characteristics of the elementary signals and a priori knowledge, to steer these elementary signals toward the most appropriate COM processing operations and RAD processing operations. This allows these specific RAD or COM secondary processing operations not to be disrupted by the presence of COM or RAD signals, respectively.

The monitoring of an interception over time (also called "tracking of the transmitter") must face a large number of ambiguities due to the presence of many similar transmitters in the spectrum. This requires the processing operations to best take advantage of the specificities of each intercepted signal. As a result, it is necessary for the sensor to have a secondary analysis allowing data processing specific to the monitoring of the RAD emissions, and other data processing specific to the monitoring of the COM emissions.

The present sensor is particularly appropriate for the evolution of radioelectric emissions. Indeed, there is no a priori hypothesis on the intercepted waveforms (only RAD or only COM). The sensor 10 is thus capable of processing all radar and radiocommunication emissions, both current and future. The transmitters will seek to optimize their spectral occupancy (distribution of the allocation of the frequencies by the regulating authorities increasingly difficult due to ever-growing needs for communication channels), the duration (for discretion needs, and slot sharing) and the peak transmitted power (time/frequency spreading).

The invention claimed is:

1. A sensor for intercepting radioelectric signals, suitable for analyzing radar emissions and communication emissions, including:

a reception stage, digitizing an incident radioelectric signal to output a digitized signal;

a primary analysis processing stage, preprocessing the digitized signal so as to determine a plurality of primary characteristics of the incident radioelectric signal, the primary analysis processing stage outputting a preprocessed digitized signal associating the plurality of primary characteristics with the digitized signal; and a secondary analysis processing stage, including a processing chain for analyzing the preprocessed digitized signal dedicated to communication emissions, and a processing chain for analyzing the preprocessed digitized signal dedicated to radar emissions, the primary analysis processing stage including a discrimination module capable of applying the preprocessed digitized signal at the input of the processing chain dedicated to communication emissions and/or at the input of the processing chain dedicated to radar emissions, based on primary characteristics determined for the incident radioelectric signal.

2. The sensor according to claim 1, wherein the reception stage includes:

a plurality of antenna arrays, each antenna array including at least one antenna and being associated with a specific frequency domain;

an antenna switch for selecting the electric signals generated by an antenna array from among the plurality of antenna arrays; and a radiofrequency receiver, the number of channels of which is equal to the number of antennas of the selected antenna array, each channel digitizing the electric signal at the output of one corresponding antenna of the selected antenna array to obtain a digital signal, the radiofrequency receiver preferably being synchronous.

3. The sensor according to claim 2, wherein each antenna array is a frequency sub-range polarization diversity antenna array.

4. The sensor according to claim 2, wherein the primary analysis processing stage includes a segmentation module for time-frequency segmenting the digital signal for each of the channels of the radiofrequency receiver, to obtain a segmented signal.

5. The sensor according to claim 4, wherein the segmentation module segments the digital signal according to at least two different time-frequency analysis resolutions.

6. The sensor according to claim 5, wherein the time-frequency analysis resolutions are variable based on frequency ranges.

7. The sensor according to claim 4, wherein the primary analysis processing stage includes a detection module verifying the presence of at least one useful signal mixed with a noise in each of the a plurality of time-frequency boxes of the segmented signal at the output of the segmentation module.

8. The sensor according to claim 7, wherein the noise is estimated by determining the lowest eigenvalues of the covariance matrix the plurality of time-frequency analysis boxes of the segmented signal.

9. The sensor according to claim 7, wherein the primary analysis processing stage includes a module for grouping together detections by estimating, for each detection, a plurality of primary characteristics from among a date of arrival, a direction of arrival, a polarization, a level, a band, a duration, a frequency, a signal-to-noise ratio of the incident radioelectric signal corresponding to the detection considered, and aggregating the detections with one another to form a synthesis object, by implementing adjacency criteria in terms of time and/or frequency, and/or similarity criteria in terms of values of one or several of the primary characteristics.

10. The sensor according to claim 9, wherein the primary analysis processing stage includes an associating module for choosing the best synthesis object from among the synthesis objects derived from the segmented signals at the output of the module.

11. The sensor according to claim 4, wherein the primary analysis processing stage includes an estimating module for estimating an IQ signal associated with the best synthesis object, the IQ signal being isolated from the digital signal of the corresponding channel of the radiofrequency receiver by filtering/decimation and optionally by spatial filtering.

12. The sensor according to claim 1, wherein the discrimination module determines the processing chain to which to send the preprocessed digitized signal, based on the primary characteristics and an a priori knowledge of waveforms of communication emissions and waveforms of radar emissions.

13. The sensor according to claim 12, wherein the a priori knowledge takes the form of a plurality of emission duration/emission frequency/elementary signal modulation band templates.

14. The sensor according to claim 12, wherein the secondary analysis processing stage includes a merging module for generating consolidated information on each incident radioelectric signal based on the outputs of the processing chain dedicated to communication emissions and the processing chain dedicated to radar emissions.

15. The sensor according to claim 14, wherein the merging module, suppresses any redundancy when preprocessed digitized signals have been directed, by the discrimination module, both toward the processing chain dedicated to communication emissions and the processing chain dedicated to radar emissions.

* * * * *